(12) United States Patent
Srinivasa (10) Patent No.: US 7,209,948 B2
(45) Date of Patent: Apr. 24, 2007

(54) COLLABORATIVE REVIEW OF DISTRIBUTED CONTENT

(75) Inventor: Deepak Srinivasa, Anjaneyanajar Banglore (IN)

(73) Assignee: International Business Machines, Corporation, Armonk, NY (US)

( * ) Notice: Subject to any disclaimer, the term of this patent is extended or adjusted under 35 U.S.C. 154(b) by 797 days.

(21) Appl. No.: 10/327,553

(22) Filed: Dec. 20, 2002

(65) Prior Publication Data

US 2004/0122898 A1    Jun. 24, 2004

(51) Int. Cl.
*G06F 15/16* (2006.01)
*G06F 17/00* (2006.01)

(52) U.S. Cl. .................. 709/204; 715/512; 715/751; 715/761

(58) Field of Classification Search .............. None
See application file for complete search history.

(56) References Cited

U.S. PATENT DOCUMENTS

| | | | | |
|---|---|---|---|---|
| 5,781,727 A | * | 7/1998 | Carleton et al. | 709/205 |
| 5,826,025 A | * | 10/1998 | Gramlich | 709/217 |
| 6,151,621 A | * | 11/2000 | Colyer et al. | 709/204 |
| 6,230,171 B1 | * | 5/2001 | Pacifici et al. | 715/512 |
| 6,342,906 B1 | * | 1/2002 | Kumar et al. | 715/751 |
| 6,687,878 B1 | * | 2/2004 | Eintracht et al. | 715/512 |
| 7,028,267 B1 | * | 4/2006 | Beezer et al. | 715/802 |
| 2003/0204490 A1 | * | 10/2003 | Kasriel | 707/2 |
| 2004/0100498 A1 | * | 5/2004 | Dietz et al. | 345/760 |
| 2004/0194021 A1 | * | 9/2004 | Marshall et al. | 715/512 |
| 2004/0201633 A1 | * | 10/2004 | Barsness et al. | 356/864 |

OTHER PUBLICATIONS

Stewart et al, Single display groupware: a model for co-present collboration, 1999, ACM Press, pp. 286-293.*

* cited by examiner

*Primary Examiner*—Bunjob Jaroenchonwanit
*Assistant Examiner*—Kenny Lin
(74) *Attorney, Agent, or Firm*—Anthony V. S. England; T. Rao Coca (57) ABSTRACT

Collaboratively reviewing a digital document in a computing environment having a visual interface involves first presenting multiple users with a copy of the digital document in a visual interface. Annotations (such as highlights, underlines, or textual annotations) are made by the users and separately recorded, independently of the client application used to view the digital document. The annotations, though, are logically linked to the digital document, and annotations made by a particular user can be recorded over multiple overlays.

18 Claims, 11 Drawing Sheets

COLLABORATIVE REVIEW OF DISTRIBUTED CONTENT

FIELD OF THE INVENTION

The present invention relates to collaborative review of distributed content.

BACKGROUND

Groupware is technology designed to facilitate the work of groups. Groupware may be used to communicate, cooperate, coordinate, solve problems, compete, or negotiate. While traditional technologies, such as the telephone, satisfy this broad definition, the term groupware is ordinarily used to refer to a specific class of technologies that rely on modern computers and computer networks, and applications such as e-mail, newsgroups, videophones, or chat. Groupware technologies are typically categorised along two primary dimensions:

(i) whether users of the groupware are working together at the same time ("realtime" or "synchronous" groupware) or different times ("asynchronous" groupware); and
(ii) whether users are working together in the same place ("collocated" or "face-to-face") or in different places ("non-collocated" or "distant").

Table 1 below presents these differentiating dimensions in tabular form and indicates typical CSCW applications that can be categorized using these dimensions.

TABLE 1

|  | synchronous | asynchronous |
| --- | --- | --- |
| collocated | voting, presentation support | shared computers |
| distant | videophones, chat | e-mail, workflow |

Software applications are used to create documents or objects that are termed "artefacts" herein. An artefact may be, for example, a research paper written by a scientist, which must be reviewed before a journal can publish the paper. Alternatively, the artefact may be a design document consisting of architecture and design diagrams created by a system analyst. Artefact refers to any digital document that is an output of a software application. Examples include text documents created by word processors, spreadsheet documents, design documents, illustrations, or software code written in a programming language. Any digital object that needs to be reviewed can, for present purpose, be assumed to be an artefact.

The review process usually involves an owner (or an owner team) who has created the artefact to be reviewed. The owner usually initiates the review process. The review typically involves a few experts, who play the role of reviewers. Review efforts by the reviewers result in review comments for provided for the benefit of the owner or owner team. Modifications to the artefact based on the review comments may then be made. The modified artefact may be further reviewed, if required.

The review can be synchronous or asynchronous. Usually, in synchronous reviews, the reviewer and the owner meet in a conference room and discuss the artefact. Reviewers provide their comments on the artefact for the perusal of the owner. Sometimes, the artefact gets modified in accordance with the review process. In the case of asynchronous reviews, the reviewers view and scrutinise the artefact offline, and document the review comments. The document is then posted to the owner, who bases modifications and further arguments upon the review document.

In both cases (synchronous and asynchronous), the way in which the review comments are communicated to the owner plays an important role in the whole process. Since the comments document forms the input for further arguments and modifications, this document should serve its purpose well by precisely and accurately capturing and communicating the thoughts of the reviewers. The objectives are to minimise the loss of information during communication and provide easy ways for the reviewer to document his thoughts on the artefact.

A reviewer can easily take a hardcopy of the artefact, and review the artefact by hand. The reviewer can readily make marks freehand on the hardcopy, drawing arrows or other visual cues, highlighting certain lines of text and so on. After this process (when the actual review takes place) is over, the reviewer then sits down to document the review comments. Most often, the reviewer is forced to document the review comments in a text file or at the most in a rich text file (providing word processing features). The reviewer is usually not allowed to make modifications to the original artefact due to configuration control issues. This step includes translation of ideas and thoughts jotted down on the hardcopy of the document, to a linear text document. It is clear that in such cases, loss of information results in several cases, and in the remaining cases too, the reviewer has to put in extra effort to capture all of his thoughts that have been already laid out. Hence this is an extra, tedious and unnatural step that can be eliminated.

The second important point concerns facilities provided for performing synchronous reviews. If the reviewers and the owner are not collocated and the review must be done synchronously, the existing groupware tools such as display-sharing applications and shared whiteboards do not provide explicit facilities for reviewing. These groupware tools do not replace meeting in a conference room and jotting down comments freehand at the most relevant places on the artefact itself.

This facility of providing the reviewers and the owner to directly communicate by making freehand marks and writing comments on the artefact, together with the support for the group interactions that are required in such an activity seems to be lacking in the existing groupware tools. Providing such a tool not only facilitates easy communication of ideas between the reviewers and the owner, but also allows those ideas and thoughts to be stored for later retrieval and use.

In view of the above comments, a need clearly exists for improved groupware applications that better facilitate the collaboration process.

SUMMARY

Facilitation of collaborative efforts by geographically distributed workers is becoming an important factor in organizational success. Several tools, which broadly fall within the name "groupware", exist to support this kind of cooperative work. Reviewing artefacts created during a business process in an organisation is a critical activity. Most often, this process of reviewing artefacts will involve people who are geographically distributed. There is, accordingly, a need for a groupware tool to support this activity.

A collaborative review tool described herein provides facilities for reviewing artefacts created using any application, without the awareness of that application. The described tool provides facilities for distributed reviewers to participate in the review.

A collaborative review tool that provides for the review of artefacts created using any application without the awareness of that application. This tool provides for distributed reviewers to participate in the review, allowing for marking text and making comments, that overlay the document without marking the original document. The tool allows for collaborative reviews, whiteboard review tools, Computer Supported Collaborative Work (CSCW), plugins for adding comments/notes to documents. Using a "transparent" overlay, reviewers may write comments directly "on" the document. The tool can be used with any application, and provides collaborative support. Multiple overlays may be used, allowing selective switching "on" and "off" overlays.

Particular features of the system described herein are that annotations, primarily review comments, are saved and logically linked to the document. Multiple overlays can be used. Also, overlays can be logically grouped (according to semantic categories, or user's identities, for example). Overlays can be selectively switched on and off as required.

The described system allows a mechanism for overlays to operate as though the overlays are embedded into the client application. Existing collaboration mechanisms can be used to address implementation details dealing with the distributed nature of collaborative computing.

DETAILED DESCRIPTION

A collaborative review toot (CRT) is described herein in the context of a distributed computer system having a graphical user interface.

Assumptions

An operating system is assumed to provide a multi-process environment. This means that the underlying operating system supports the execution of multiple processes at the same time. Although more than one process cannot run at a given time in the case of uniprocessor systems, using techniques of process-swapping (or context-switching), a virtual multi-process environment can be provided. So, more than one process can appear to be executing at the same time, though multiple processes are instead time-sharing the processor.

Figure 1:
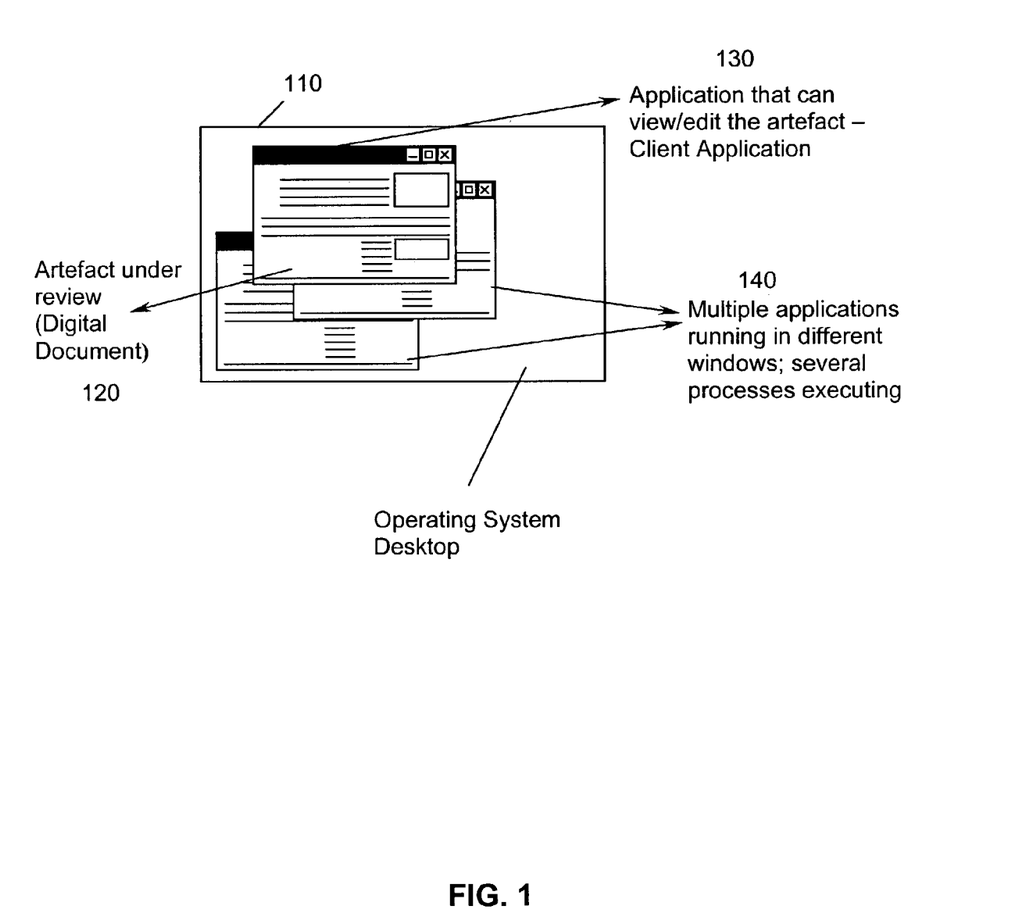
FIG. 1 is a schematic representation of a computing environment in which the collaborative review tool described herein operates.

A window-based interface is also assumed. Examples of such suitable operating systems include the Microsoft Windows operating system, and the UNIX operating system, when using X-Windows, or a similar interface. FIG. 1 represents an operating system desktop 110, a digital document under review 120 using a suitable client application 130. There are also other applications 140 executing in the background.

The artefacts to be reviewed are digital documents that are opened in client applications. Each user participating in the collaborative review has the client application on his system. The artefact to be reviewed is made available to each user during the initiation of the review. Network connectivity of all the participants of the review is assumed.

Features

The system described herein allow reviewers and the owner to communicate their thoughts and ideas on the artefact by allowing reviewers to directly write and make marks at relevant places on the artefact. The original artefact is unaltered, and no configuration control violations occur. Although users perceive that they are editing the artefact directly by writing on the artefact, the actual artefact is not modified at all.

Figure 2:
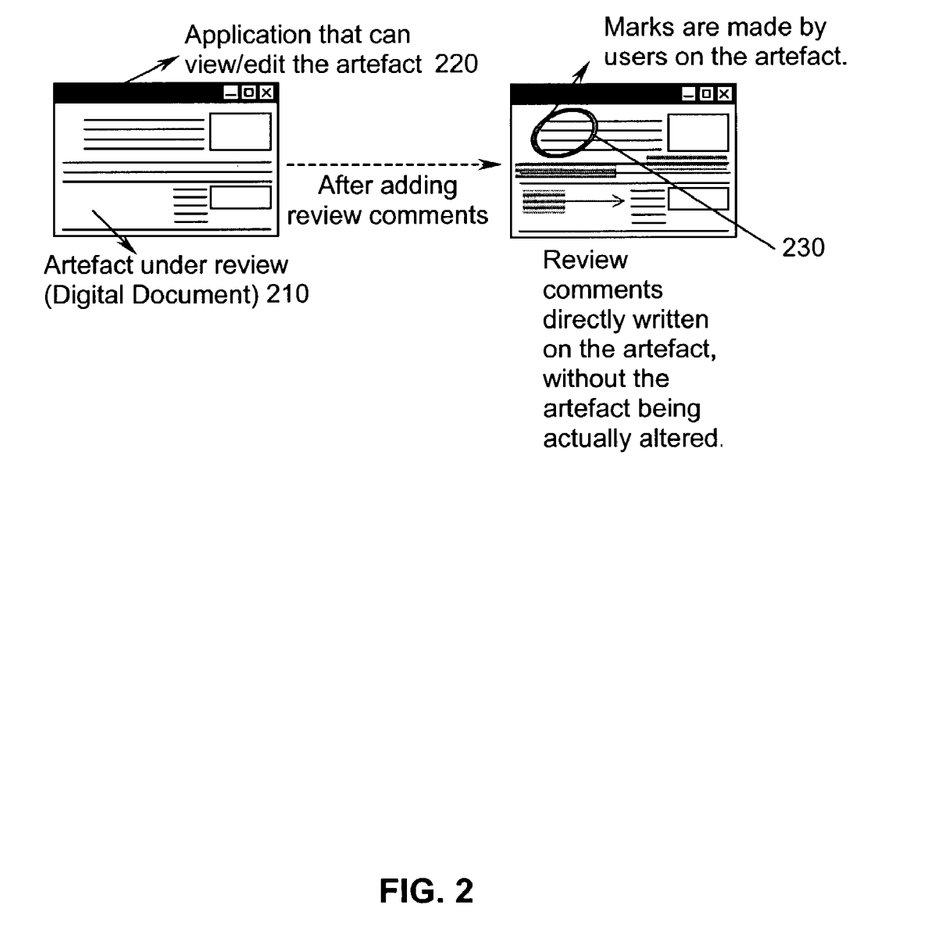
FIG. 2 is a schematic representation of annotations applied by a user to a digital document.

FIG. 2 represents this phenomenon. An artefact 210 is viewed in a client application 220, and a user has the sensation of making marks on the artefact 210. The users have the artefact 210 opened in the corresponding client application 220. Once the CRT is activated, the users are then able to write directly on the artefact 220 inside the client application window itself. The review comments 230 are made seemingly on the client application window, directly on the artefact itself.

Irrespective of the application that is used to create the artefact or that is used to view the artefact, the system is able to allow the users to make marks and comments on the artefact. This essentially implies that the applications that are used to edit/view the artefacts operate independently of a system to support collaborative review, but yet allows the users to make comments on the artefact in a seamless manner.

Overlays can be strapped on to applications to write over the artefacts. Thus the users of the collaborative review tool are able to strap on overlays (or sometimes called "transparencies" in analogy to those that are used for overhead transparency projectors) on top of the client applications. This approach provides users with the perception of directly annotating the artefact.

Figure 3:
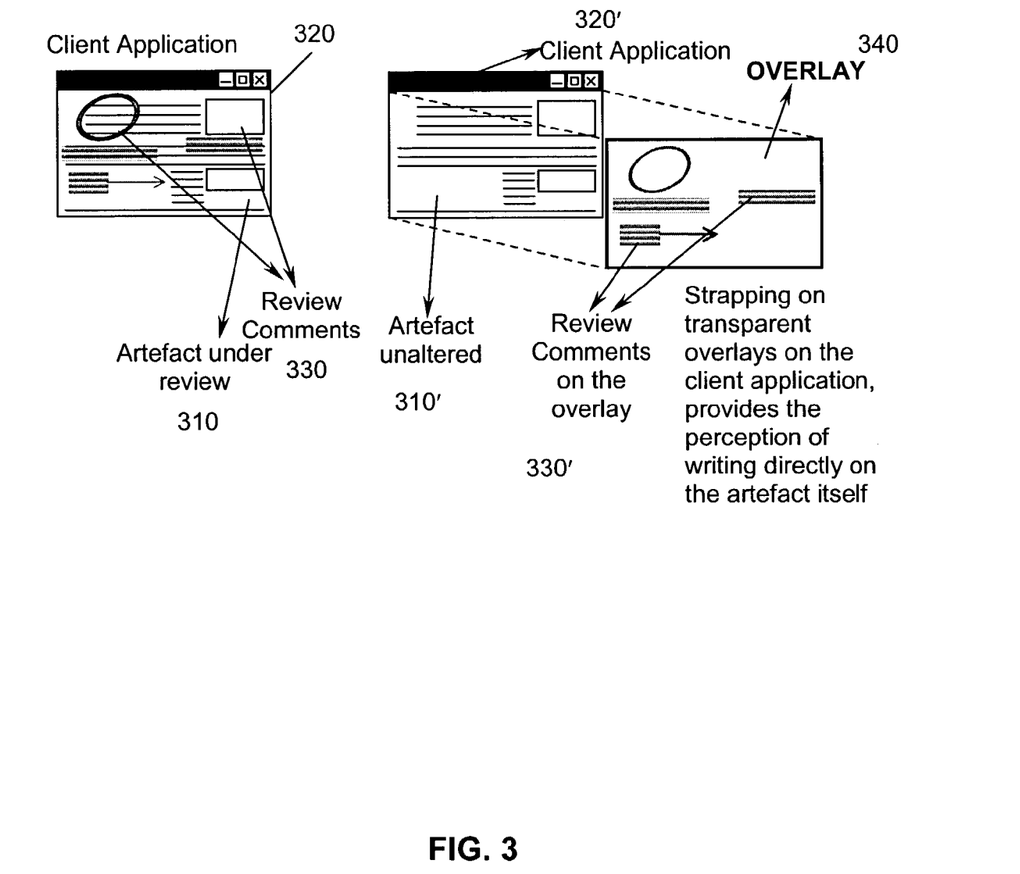
FIG. 3 is a schematic representation of how an annotated document is presented to a user, and how the annotations are recorded separately from the document.

FIG. 3 further illustrates this phenomenon. For an artefact under review 310 in a client application 320, review comments 330 are added by a user. An overlay 340 records the review comments 330'. The overlay 340 is independent of the artefact 310' and the client application 320'.

Each user can strap on multiple overlays on an application during the review process. The overlays strapped on by a user are made available as a read-only overlay for all the other participants of the review session. The option of viewing the overlays belonging to a particular participant should be given to the user so that the user can selectively switch off certain overlays.

Figure 4:
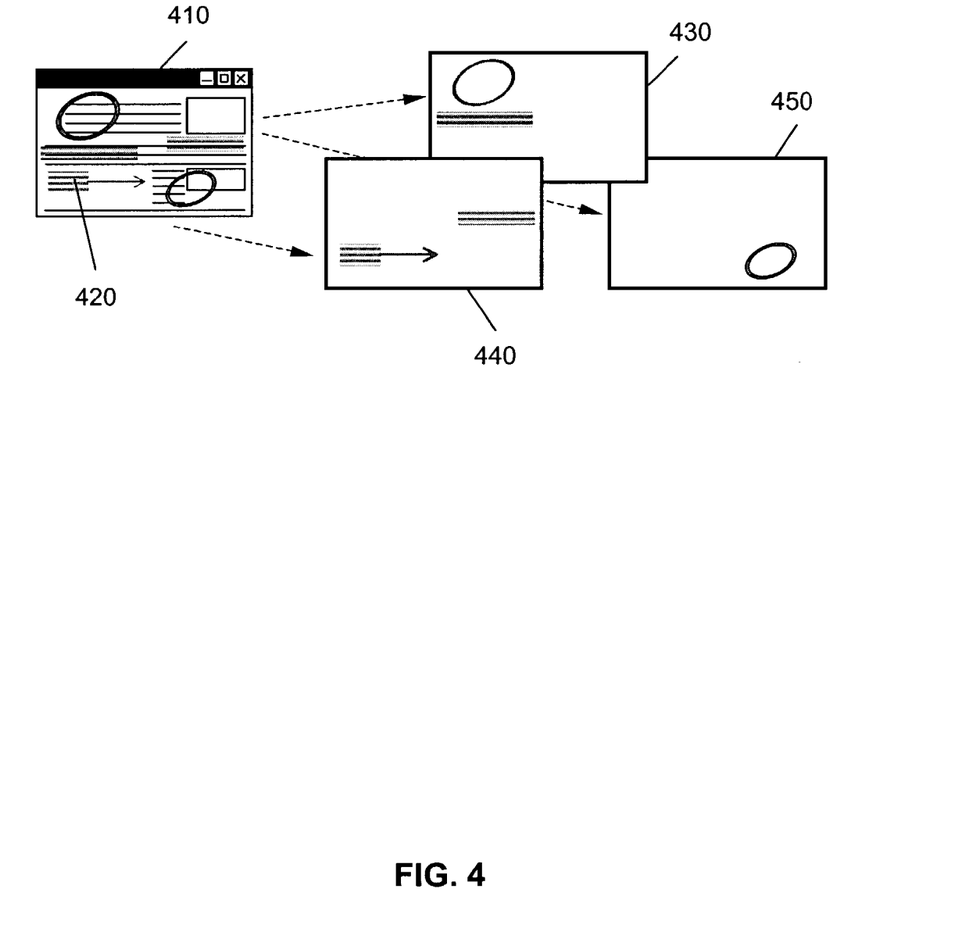
FIG. 4 is a schematic representation of how a user's annotations can be separately recorded in multiple overlays.

FIG. 4 represents the use of multiple overlays. An artefact 410 is marked by review annotations 420 that are recorded, in a distributed manner, between respective overlays 430, 440 and 450.

Standard whiteboard features are provided for editing using the overlays. Such features include the ability to make freehand marks on the overlays, write text, draw objects on the overlay, and so on. Other examples include selection and movement of annotations to different parts of the overlay as the artefact beneath is moved/edited. This becomes necessary as the system is independent of the client applications, and the client applications are unaware of the existence of such a collaborative review system functioning on top of the client applications.

Asynchronous review is possible. Review comments that are made directly on the artefact are recorded without altering the artefact. These comments can then be viewed and edited later by users.

Synchronous collaborative review is also possible. Facilities are provided for inviting participants into the review activity. Facilities for updating each and every participant of the review comments that every reviewer makes. The marks and the notes made on the artefact are reflected immediately on the display of all the participants of the review. Synchronisation features for the artefact editing are to be provided.

Example Usage

Typical scenarios during the usage of the tool are now presented. The two scenarios considered are synchronous and asynchronous reviews. In both the cases, the way in which the CRT is launched and the method by which the overlays are strapped on to the application remain the same. The synchronous review case needs to handle the collaboration aspects of the review process, which are detailed below.

In the case of asynchronous review, the owner of the artefact sends the artefact to all the invited reviewers. Typically, a reviewer opens the artefact in the corresponding client application. The reviewer then proceeds to launch the CRT, which automatically straps on a default overlay onto the client application. The reviewer then proceeds to make observations on the artefact. The reviewer has the option of working with the client application (application mode) or to toggle to the overlay (overlay mode) that has been strapped on. Normally, the reviewer need not edit the artefact in any way. He needs to provide comments on the artefact and for that purpose he toggles to the overlay provided by the CRT.

Once the reviewer is in the overlay mode, the reviewer can use a toolbox provided by the CRT. This toolbox contains tools that allow the reviewer to make marks on the overlay, highlight certain parts, write text comments at certain places on the overlay or draw simple geometric objects on the overlay. The overlay is strapped on to the artefact in such a manner that if the client application scrolls the artefact (horizontally or vertically), the overlay also scrolls. Thus the size of the overlay and the currently active part of the overlay is always maintained in harmony with the artefact.

The user also has the option to strap on more overlays onto the artefact and write comments on them. Each overlay will be treated separately and they can be switched on and off during the review process. Once the reviewer is through with the review, the overlay set is saved and is logically linked with the artefact.

Neither the artefact nor the client application is in any way aware of the CRT and the logical linking that has been made between the artefact and the overlay set. Once this is done, the overlay set can be dispatched back to the owner so that he can open it with his CRT and view the comments. He then proceeds to act upon the comments either by modifying the artefact as required or/and provide counter-remarks to the review comments by editing the overlays. This process may then be repeated for a required number of times.

In the case of synchronous review, the owner of the artefact or the initiator of the review process launches the client application. The reviewer then loads the artefact into the client application. Then he launches the CRT. Once CRT is launched, a default overlay is strapped on to the client application over the artefact. He then toggles onto the overlay mode. In the overlay mode, the owner/initiator specifies that the review is a synchronous review. The CRT then brings up a dialog with the user and asks for the participants information. The owner/initiator gives in the information about the participants.

The system then issues invitations to all the participants to join the review. The system also provides information about the artefact being reviewed and the corresponding client application that is required for the review. The reviewers can accept the invitation or decline the invitation. Those who accept the invitation must launch the appropriate client application and inform the CRT system about their readiness. The artefact is then multicast to all the participants, which is then loaded in the client application. The reviewers then inform the CRT about their readiness to start the review process.

At this time, a default overlay for each participant is created and strapped onto the client application (this has already been done for the initiator of the review). Once this is done, all the overlays of the different participants are replicated in each of the user's instance of the client application.

The review process then begins. Any participant can make marks or write comments on the overlays (the participants can strap on more than one overlay in order to logically organise their comments), which is immediately reflected on every other participant's systems. A participant will not have control over the overlays of other participants. However, by providing some kind of synchronisation mechanism, facility will be provided to edit the artefact as and when required by any of the participants. Each of the overlay sets belonging to the participants can be saved and linked logically with the artefact. This is how the synchronous reviews are made much richer and productive by the user of the Collaborative Review Tool.

Transparent overlays operate on top of "unaware" (that is, largely independently of) client applications. The emphasis is on getting the whole system to be adaptable to any client application, without any need for explicit customisation. The environment provided for writing the review comments imposes only a minimum awareness and actions on the part of the participants of the review.

The system supports synchronous review, which includes facilities for replicating the overlays on every participant's instance of the client application. These facilities are only outlined to the extent that the approach is clear to a knowledgeable person in the field. Specifically, a departure is made from the existing systems in handling the replication of overlays onto the displays of all the participants. A view-model approach is taken, and only the model is multicast to participants. The views are individually handled by the participants. Thus the approach is different from the standard event-multicasting display-sharing mechanisms.

Collaborative Architecture

Figure 5:
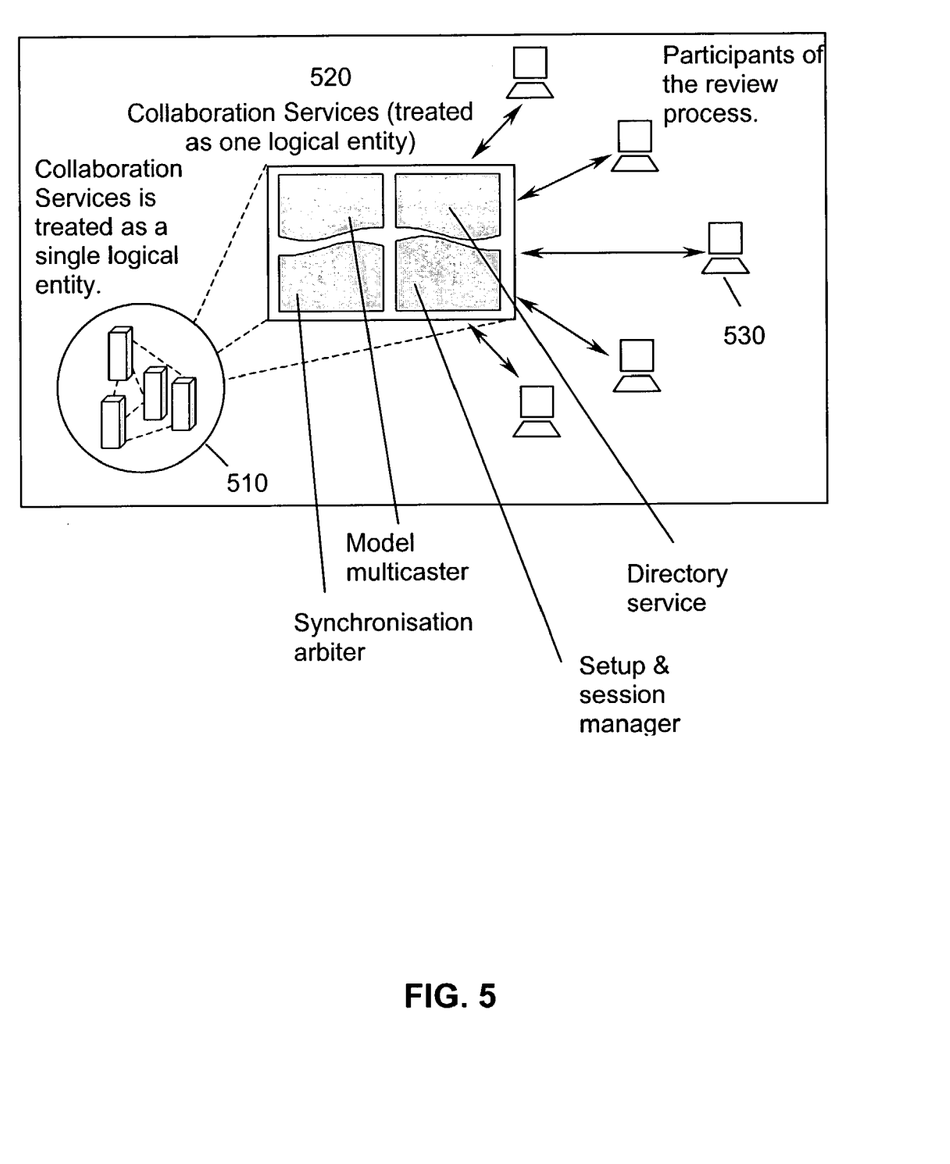
FIG. 5 is a schematic representation of an architecture that can be used to support of the collaborative review tool.

FIG. 5 represents the architecture that supports the distributed/collaborative behaviour of the tool. Distributed or consolidated computing services 510 are provided, which host collaboration services 520. Participants in the review process 530 use the collaboration services 520 to review artefacts in a collaborative manner. The collaboration services 520 comprises various components, that are represented in FIG. 5 as (i) model multicaster, (ii) directory service, (iii) synchronisation arbiter, and (iv) setup and session manager.

These four identified components are the major components that can be used to provide the collaboration services required by the current application for synchronous reviews to take place. Although these services are shown together in FIG. 5, these services may in turn be implemented in a distributed manner. The role of each of these components is described below.

Setup and Session Manager

This component is responsible for establishing a "Review Session" for each review activity. These responsibilities include inviting the listed participants, and providing the artefact to be reviewed to each of the participant. Other functions include handling the dynamic entry and exit of participants, and maintaining the session information after establishment. The initiator of the review uses this component for initiating the review process.

Directory Service

This component maintains the identities of the participants. This is useful for creating invitations for the review process. Any user interested in participating in a review process should enrol in this directory. The setup and session manager component works with this component during the establishment of the review session.

Synchronisation Arbiter

The artefact is an element in the review process that needs synchronisation facilities. Several users might attempt to access and modify the artefact at the same time. Synchronising access to this component, providing tokens for the users, and maintaining the integrity of the artefact are the responsibilities of this component.

Model Multicaster

During synchronous review, the overlays of each of the participants are replicated in every other participant's instance of the CRT. The way in which the participants make marks on the overlay and write on the overlay are all replicated in real time by the system. This replication requires multicasting of information, which is handled by this component. The key is to decide on which information is to be multicasted. This decision can make a lot of difference to the performance of the collaboration system.

The standard approach is to multicast all the events generated by each participant to all the other participants. One attempts to keep the displays of every participant in sync. The idea is to replicate each event that occurs on a system on every other system in the session. This way, the overlays are kept in sync and replication is achieved. This absolute approach, however, can be costly in terms of computation and network resources.

Accordingly, a different approach is adopted in this system. No multicasting of events occurs. Instead, a model-view approach is taken. Each participating system maintains its own view. No attempt is made to sync the user interface actions of the users such as mouse movements, or drawing lines. Every overlay, however, is associated with a model.

The model is nothing but the data that needs to be stored for that overlay. All other participants subscribe to the changes to this model. Whenever there is a change to this model (such as, the data associated with the model, such as a drawn line or added textual comments), the subscribers of this model are notified to update their views.

Thus a change to any overlay changes the model that the overlay represents at the Model Multicaster component. This change, in turn, triggers a multicast of this information to all the other participants of the review. The other participants, upon the receipt of this information, fetch the updated model and redisplay the overlay according to the latest information available. This approach avoids the multicasting of event, segmentation of user events and the problems associated with such approaches.

Overlay Architecture

The second aspect of the system architecture is the functioning of transparent overlays on unaware client applications. The general strategy adopted for making the transparent overlays work is to inject into the client process a small snippet of code (termed proclet), that handles the client application specific details. This proclet is responsible for communicating the relevant events and other information to the CRT process.

Figure 6:
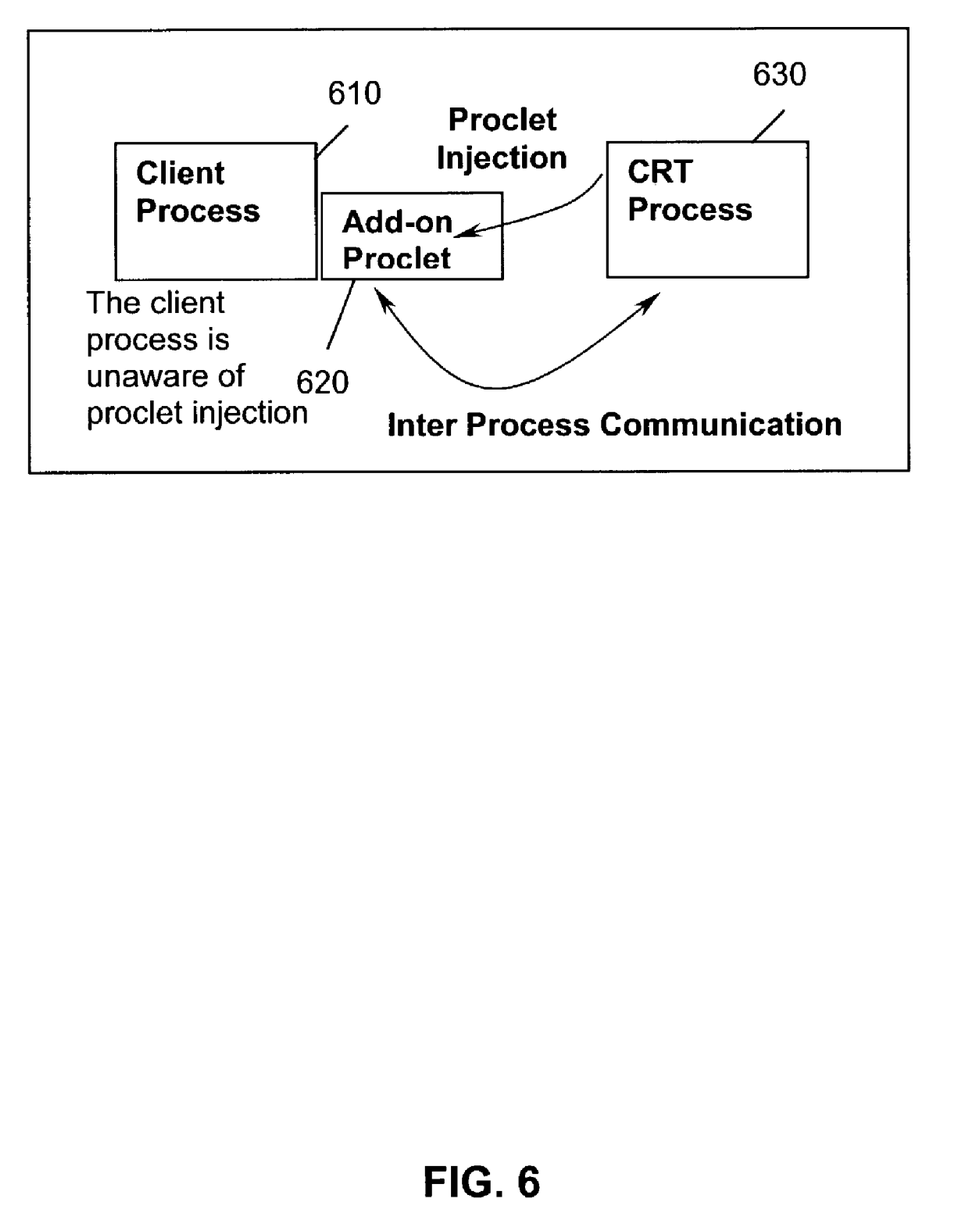
FIG. 6 is a schematic representation of how independence is achieved between a client application and collaborative processing.

FIG. 6 illustrates the strategy suggested to achieve this functionality. A client process 610 has an add-on proclet 620, of which the client process is unaware. A CRT process 630 interacts with the client process 610 indirectly through the proclet 620.

The user starts the client application and loads the artefact into the client application. Later, the user starts the CRT process, and informs the CRT process about the identity of the client application. The CRT process then injects the proclet into the client process. This step is performed without the knowledge of the client application.

Once the proclet is injected into the process area of the client application, then some means of inter process communication is established between the proclet and the CRT process. This communication then helps in handling several other aspects of the expected behaviour.

Implementation Details

Some observations are described below concerning implementation details of the CRT. For the purposes of explanation, a Microsoft Windows operating system is assumed to be the operating environment in which the client applications and the CRT operates. Similar techniques, however, exist for other computing platforms.

Document-View Model

Figure 7:
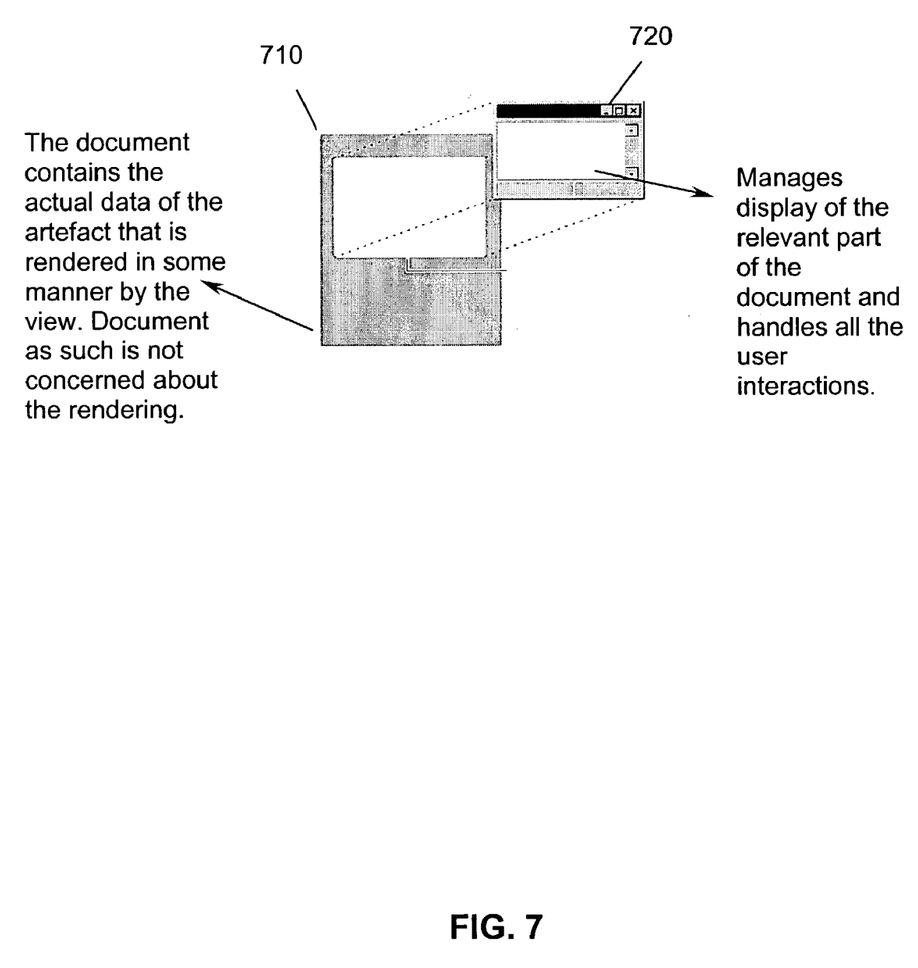
FIG. 7 is a schematic representation of a document-view model that can be used to present documents in an interface.

Windows applications follow the document-view model. FIG. 7 schematically represents this model. A document 710 contains actual data independent of the manner in which the data is presented. A viewing window 720 manages the display of the relevant parts of the document 710, and interactions with a user.

This document-view model allows an application to store and manage the data (document) as separate entity and manage the view of that document as a separate entity. The document stores the data and manages printing the data and coordinates updating multiple views of the data. The view displays the data and manages user interaction with the view, including selection and editing. In this model, a document object reads and writes data to persistent storage. The document may also provide an interface to the data wherever this data resides (such as in a database).

A separate view object manages data display, from rendering the data in a window to user selection and editing of data. The view obtains display data from the document and communicates back to the document any data changes.

The CRT described herein is more concerned with the view rather than the document. The overlays manipulate the view to provide the effect of transparent annotations on the artefact, and also ensure that the document is not altered. This implies that the CRT is dealing more with the view of the client application and not the document.

Windows applications operate based on interchange of messages. Each application has a message queue into which messages are sent by the operating system, other applications or even by the same application. A typical Windows application is designed to handle the relevant messages in order to accomplish its tasks. The system generates a message at each input event—for example, when the user types, moves the mouse, or clicks a control such as a scroll bar. The system also generates messages in response to changes in the system brought about by an application, such as when an application changes the pool of system font resources or resizes one of its windows. An application can generate messages to direct its own windows to perform tasks or to communicate with windows in other applications.

The particular message that interests the current work is the PAINT message. This is a message sent by the operating system or the application itself whenever there is a need for the view to be refreshed. Typically, the operating system sends this message if the application window is maximised, resized, or if the window becomes visible as a result of another window being closed or minimised. The application typically sends this message to itself whenever the data that is displayed (the document) is modified and therefore a refresh of the view needs to be performed.

Figure 8:
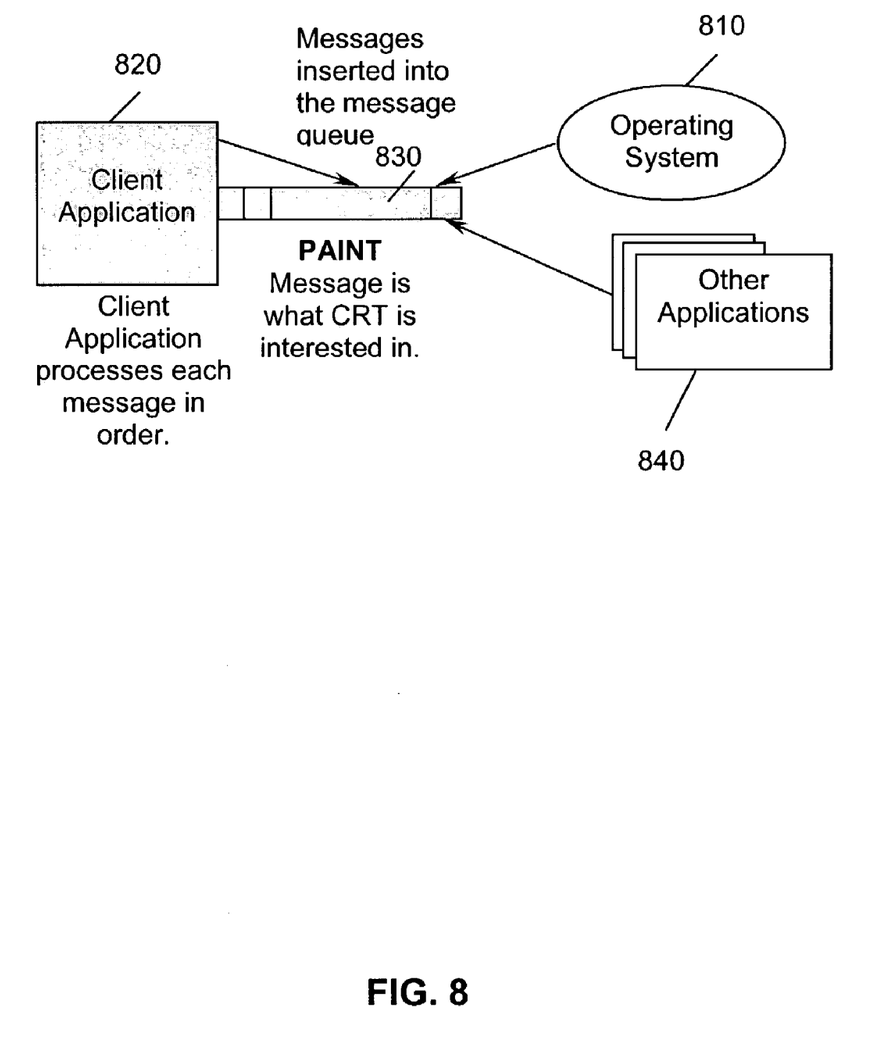
FIG. 8 is a schematic representation of a communications model that can be used to communicate in a computing environment that can be used to support the collaborative review tool described herein.

FIG. 8 represents this arrangement. An operating system 810 hosts a particular client application 820 and other applications 840. A message queue 830 for the client application 820 facilitates communications between the applications 820, 830 and the operating system 810.

Proclet Injection

The client application process is separate from the CRT process. The system, however, must function as an integral whole. To accomplish this, the strategy outlined above requires a portion of code (in this case, termed a proclet) to be injected into the client application process. Several techniques are available in Windows for this purpose. The proclet is essentially a dynamic linked library (DLL) that is injected into the process space of the client application. Once the DLL is successfully injected, events can be captured, as detailed later.

The DLL can be injected in a variety of ways, for example, using Registry, Windows Hooks or Remote Threads. Of these three methods, the second method (Window Hooks) is the most suitable for this work since this technique does not involve restarting the operating system (as in the Registry method) and is not very complex. Accordingly, the Windows Hooks method is described in further detail below.

The idea here is to install a hook into a message for a client application. This is a facility provided by the Windows operating system, which allows any other process to supply a function called the filter function that can intercept any Windows message before it is delivered to the client application.

Once the hook is installed, Windows checks to see which is the filter function that has to be called whenever the hooked message is to be sent to the client application. Now, if the filter function is placed in a separate DLL that has not been loaded within the process space of the client application, Windows loads the DLL explicitly. This is the action is used to load a new DLL. This new DLL is actually a part of the CRT. The DLL contains all the code that is required to interact with the client application. Details concerning the nature of this interaction are described below. For now, suffice to say that suitable code can be injected into the process space of unaware client applications.

Capturing Messages

The proclet injection method described above requires a Windows message to be hooked in order to load the Proclet. The CRT is, as described above, concerned with the view of the client application rather than the document. An approach that can be taken is to hook the PAINT message (WM_PAINT) of the client application. This not only serves to inject the DLL into the process space, but also achieves the capture of the message that is required for CRT. Once this capture is done, the following numbered sequence of events outlined in Table 1 below are setup for the functioning of transparent overlays, with reference to FIG. 9. Since these events happen each time the view is refreshed, a perception of transparent overlays over the artefact is provided.

Figure 9:
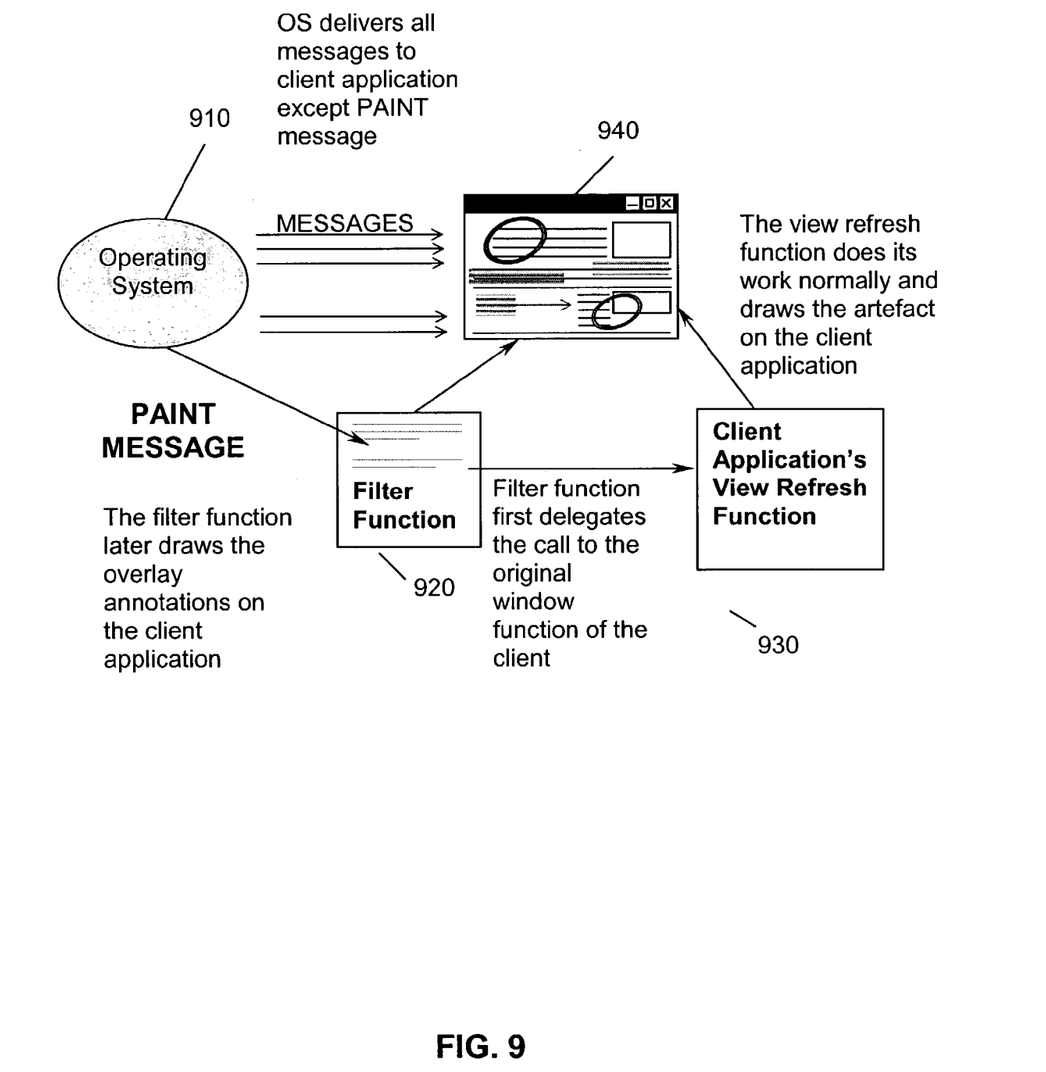
FIG. 9 is a schematic representation of application mode event handling in a computing environment that can be used to support the collaborative review tool described herein.

FIG. 9 represents these events in application mode event handling. An operating system 910 sends a paint message in step 915 to a filter function 920. The filter function first delegates the call to the original window function of the client in step 925. The call is delegated to the client application's view refresh function 930. In step 935, the artefact is drawn on the client application 940.

TABLE 1

| | |
|---|---|
| step 915 | For every PAINT message generated for the client application, Windows calls the filter function instead of the registered client application function. |
| step 925 | The filter function then uses the same PAINT message to first get the client application paint the view as it would normally have done if the hook wasn't present. |
| step 935 | Once that part is over, the artefact has been drawn on the client application. The filter function then proceeds to communicate with the CRT process to get the data of the overlays that need to be painted on the artefact. |
| step 945. | The filter function then paints the overlays on the artefact. |

Figure 10:
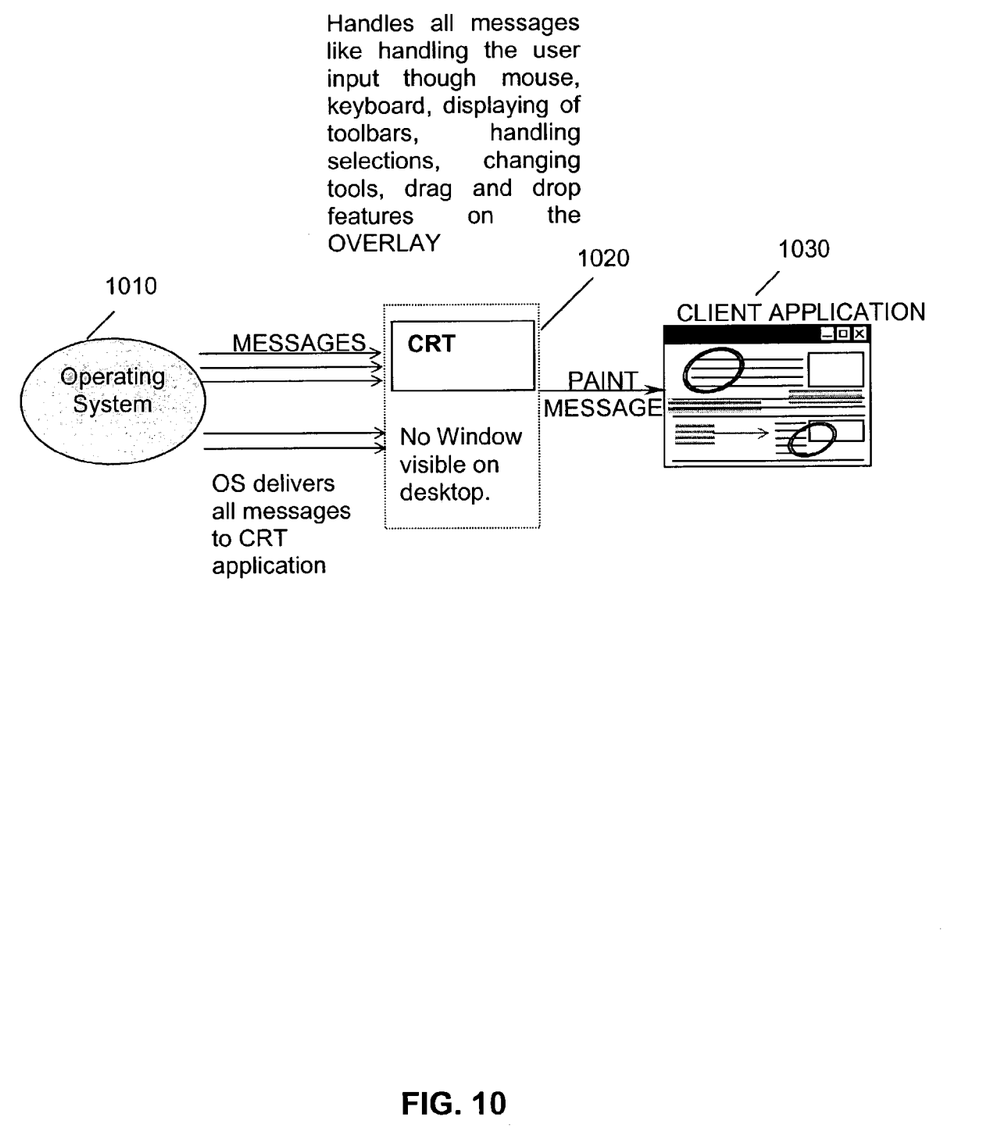
FIG. 10 is a schematic representation of overlay mode event handling in a computing environment that can be used to support the collaborative review tool described herein.

FIG. 10 schematically represents overlay event mode handling. When the user switches to the overlay mode, the CRT process 1020 (or the hidden window associated with the CRT process) receives all the Windows messages and events from the operating system 1010. The application 1030 then behaves as any other whiteboard application would do, and the overlay data is updated based on the actions performed by the users. A PAINT message is despatched as necessary to the client application 1030, which updates the artefact and the overlays due to the existence of the filter function. Thus transparent overlay behaviour is achieved in both the overlay and the application modes.

The data regarding the overlays is stored in the CRT process, but displayed in the client application. The proclet injected into the client process communicates through any available interprocess mechanisms, and obtains the data for the view refresh activity. The CRT process runs in the background. No visible window is associated with the CRT application.

Also, crash of the client application does not result in the loss of review comments/annotations written on the overlays. As these annotations are saved independently, these annotations can be used for later review sessions. Various other issues are discussed concerning implementation details are now described.

Miscellaneous

The concept of hotkey is used to inform the CRT about the client application to which the overlay is to be strapped. This can be achieved by continuously monitoring the event queue and waiting for a particular key combination to occur (for example, Ctrl+F12 may be the designated hotkey). Once this combination of keys is keyed by the user, an is provided indication to the CRT process to assume that the application that is currently active is the client application. The CRT then proceeds with the process of proclet injection described above.

Similarly, another hotkey combinations can be used to inform the CRT that the user wishes to toggle from one of the modes to the other (application mode to overlay mode or vice versa).

When a user wishes to change the view-size of the artefact, a mechanism is provided by which the user can change the view-size of the overlays as well. The user can then choose to resize the overlay by an amount corresponding to the resizing that was done on the artefact. This explicit action can be initiated by the user, as automation is inappropriate if the client application is to operate completely and strictly independently of the CRT. Other possibilities, such as demanding the client application to adhere to a protocol and inform the CRT of the change in the view-size of the artefact can be used, but are generally not favoured.

The size of the overlay, that is, the length and the width of the overlay, is maintained in sync with the size of the artefact. For this purpose, the size of the canvas of the client application window can be queried along with the position of the scroll thumbs (both in horizontal and vertical directions). Using the data thus obtained, the size of the overlay can be maintained in sync. Also, the portion of the overlay displayed can be identified. Thus, actions such as adding more matter into the artefact, scrolling the client application window horizontally and vertically produce corresponding actions on the overlay.

Facilities are provided that allow the user to select portions of the overlay and move the selected portions in order to keep the annotations in position sync with the edited artefact. Such a solution is desirable if strict independence of the client application and the CRT is to be maintained.

The overlay set is stored in a suitable format understandable to the CRT. The name of the artefact (that is, the filename) can be used to link the overlay set logically with the artefact. Alternatively, a hash value can be computed based on the contents of the file and that name can be used to link the overlay set. In this case, even if the name of the file changes, the CRT is still able to identify the logical linking. If the contents of the artefact change, however, the hash value also changes and in that case this method fails. A combination of these two methods can be used.

Computer Hardware and Software

Figure 11:
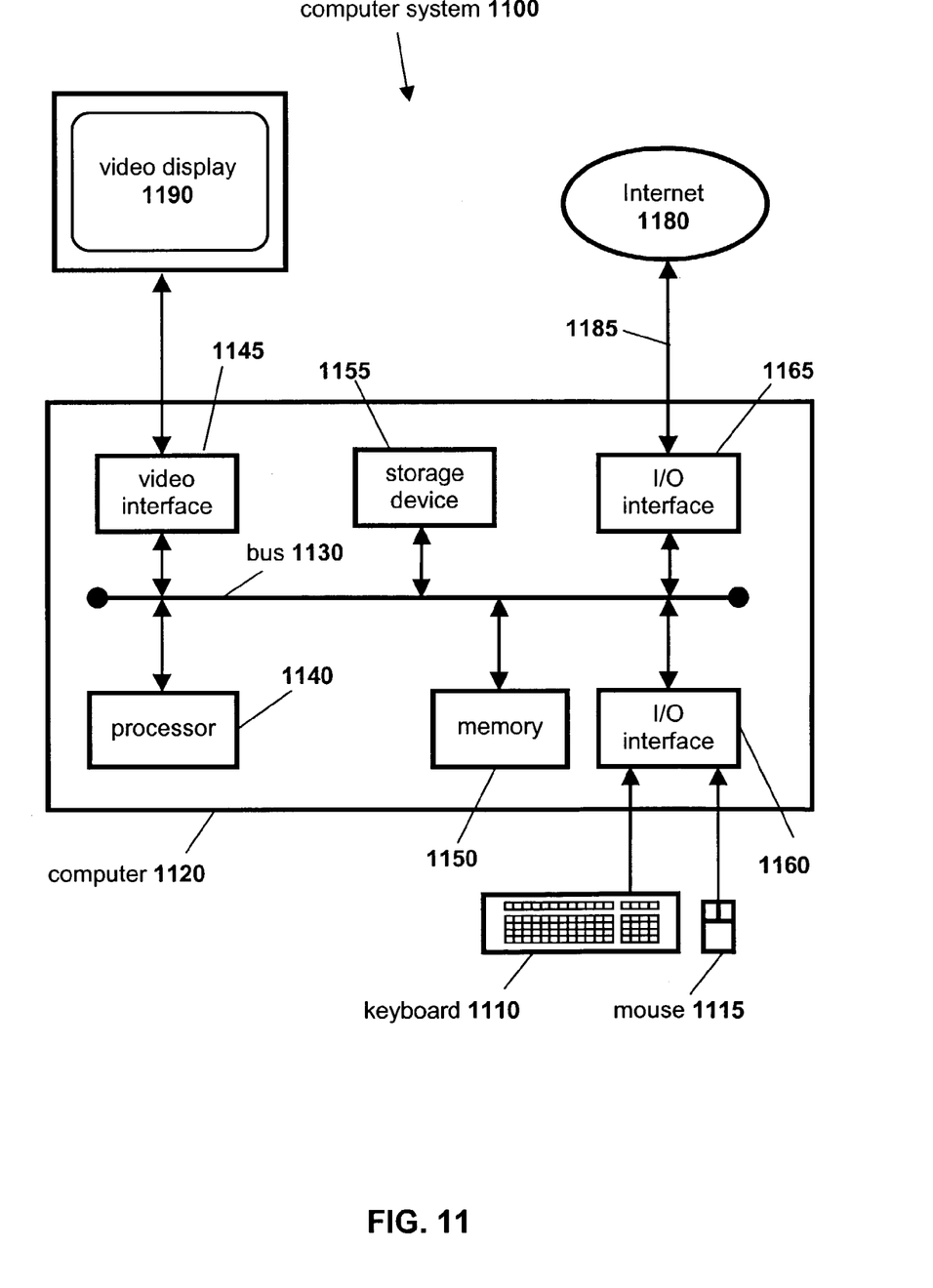
FIG. 11 is a schematic representation of a computer system suitable for performing the techniques described with reference to FIGS. 1 to 10.

FIG. 11 is a schematic representation of a computer system 1100 that can be used to implement the techniques described herein. Computer software executes under a suitable operating system installed on the computer system 1100 to assist in performing the described techniques. This computer software is programmed using any suitable computer programming language, and may be thought of as comprising various software code means for achieving particular steps.

The components of the computer system 1100 include a computer 1120, a keyboard 1110 and mouse 1115, and a video display 1190. The computer 1120 includes a processor 1140, a memory 1150, input/output (I/O) interfaces 1160, 1165, a video interface 1145, and a storage device 1155.

The processor 1140 is a central processing unit (CPU) that executes the operating system and the computer software executing under the operating system. The memory 1150 includes random access memory (RAM) and read-only memory (ROM), and is used under direction of the processor 1140.

The video interface 1145 is connected to video display 1190 and provides video signals for display on the video display 1190. User input to operate the computer 1120 is provided from the keyboard 1110 and mouse 1115. The storage device 1155 can include a disk drive or any other suitable storage medium.

Each of the components of the computer 1120 is connected to an internal bus 1130 that includes data, address, and control buses, to allow components of the computer 1120 to communicate with each other via the bus 1130.

The computer system 1100 can be connected to one or more other similar computers via a input/output (I/O) interface 1165 using a communication channel 1185 to a network, represented as the Internet 1180.

The computer software may be recorded on a portable storage medium, in which case, the computer software program is accessed by the computer system 1100 from the storage device 1155. Alternatively, the computer software can be accessed directly from the Internet 1180 by the computer 1120. In either case, a user can interact with the computer system 1100 using the keyboard 1110 and mouse 1115 to operate the programmed computer software executing on the computer 1120.

Other configurations or types of computer systems can be equally well used to implement the described techniques. The computer system 1100 described above is described only as an example of a particular type of system suitable for implementing the described techniques.

CONCLUSION

The above-described implementation is described in the context of Microsoft Windows operating systems. Corresponding implementations can be provided for other operating systems.

Various alterations and modifications can be made to the techniques and arrangements described herein, as would be apparent to one skilled in the relevant art.

I claim:

1. A method for reviewing a digital document, the method comprising the steps of:
 presenting the digital document synchronously to multiple users at respective computer systems, wherein the presenting is by visual interfaces of respective client applications running on the respective computer systems;

recording annotations for the digital document made by a first one of the users, wherein the annotations made by the first user are recorded independently of the first user's client application, the first user's annotations being associated with an overlay of the first user, wherein the annotations and the overlay are logically linked to the digital document such that respective portions of the first user's overlay correspond to respective portions of the digital document;

presenting the overlay synchronously to the multiple users; and delivering a new annotation of the first user synchronously to the multiple users for updating of the respective multiple users' presentations of the overlay, wherein the synchronous delivering is responsive to the first user making the new annotation, and wherein the synchronous presenting of the digital document and the overlay includes asynchronously presenting portions of the digital document and the overlay to the multiple users, such that the multiple users are independently presented respective portions of the digital document selected by the respective users and respectively corresponding portions of the overlay, wherein the first user changing the portion of the digital document and corresponding portion of the overlay presented to the first user does not change the respective portions of the digital document and corresponding portions of the first user's overlay presented to the other ones of the multiple users.

2. The method as claimed in claim 1, the method including:
recording annotations for the digital document made by additional ones of the users, the users' annotations being associated with respective overlays.

3. The method as claimed in claim 2, the method including:
grouping the overlays in logical groups.

4. The method as claimed in claim 2, the method including:
switching, off ones of the overlays.

5. The method as claimed in claim 1, wherein annotations made by respective ones of the users cannot be edited by other ones of the users.

6. The method as claimed in claim 1, wherein the recording of annotations of the respective users includes:
recording annotations by respective annotation applications of the respective users.

7. An article of manufacture including computer software recorded on a tangible, computer readable medium, for reviewing a digital document, the computer software comprising:
software code for presenting the digital document synchronously to multiple users at respective computer system, wherein the presenting is by visual interfaces of respective client applications running on the respective computer systems; and software code for recording annotations for the digital document made by a first one of the users, wherein the annotations made by the first user are recorded independently of the first user's client application, the first user's annotations being associated with an overlay of the first user, wherein the annotations and the overlay are logically linked to the digital document such that respective portions of the first user's overlay correspond to respective portions of the digital document;

software code for presenting the overlay synchronously to the multiple users; and software code for delivering a new annotation of the first user synchronously to the multiple users for updating of the respective multiple users' presentations of the overlay, wherein the synchronous delivering is responsive to the first user making the new annotation, and wherein the synchronous presenting of the digital document and the overlay includes asynchronously presenting portions of the digital document and the overlay to the multiple users, such that the multiple users are independently presented respective portions of the digital document selected by the respective users and respectively corresponding portions of the overlay, wherein the first user changing the portion of the digital document and corresponding portion of the overlay presented to the first user does not change the respective portions of the digital document and corresponding portions of the first user's overlay presented to the other ones of the multiple users.

8. The computer software as claimed in claim 7, the software code including:
software code for recording annotations for the digital document made by additional ones of the users, the users' annotations being associated with respective overlays.

9. The computer software as claimed in claim 8, the software code including: software code for grouping the overlays in logical groups.

10. The computer software as claimed in claim 8, the software code including: software code for switching off ones of the overlays.

11. The computer software as claimed in claim 7, wherein annotations made by respective ones of the users cannot be edited by other ones of the users.

12. The computer software as claimed in claim 7, wherein the recording of annotations of the respective users includes:
recording annotations by respective annotation applications of the respective users.

13. A system comprising:
a processor; and
a storage device connected to the processor, wherein the storage device has stored thereon a program for controlling the processor, and wherein the processor is operative with the program to execute the program for performing the steps of:

presenting a digital document synchronously to multiple users at respective computer systems, wherein the presenting is by visual interfaces of respective client applications running on the respective computer systems;

recording annotations for the digital document made by a first one of the users, wherein the annotations made by the first user are recorded independently of the first user's client application, the first user's annotations being associated with an overlay of the first user, wherein the annotations and the overlay are logically linked to the digital document such that respective portions of the first user's overlay correspond to respective portions of the digital document;

wherein the steps further include:

presenting the overlay synchronously to the multiple users; and delivering a new annotation of the first user synchronously to the multiple users for updating of the respective multiple users' presentations of the overlay, wherein the synchronous delivering is responsive to the first user making the new annotation, and wherein the synchronous presenting of the digital document and the overlay includes asynchronously presenting portions of the digital document and the overlay to the multiple users, such that the multiple users are independently presented respective portions of the digital document selected by the respective users and respectively corresponding portions of the overlay, wherein the first user changing the portion of the digital document and corresponding portion of the overlay presented to the first user does not change the respective portions of the digital document and corresponding portions of the first user's overlay presented to the other ones of the multiple users.

14. The computer system as claimed in claim 13, wherein the processor is operative with the program to execute the program for performing the steps of:
recording annotations for the digital document made by additional ones of the users, the respective users' annotations being associated with respective overlays.

15. The computer system as claimed in claim 14, wherein the processor is operative with the program to execute the program for performing the steps of:
grouping the overlays in logical groups.

16. The computer system as claimed in claim 14, wherein the processor is operative with the program to execute the program for performing the steps of:
switching off ones of the overlays.

17. The computer system as claimed in claim 13, wherein annotations made by respective ones of the users cannot be edited by other ones of the users.

18. The computer system as claimed in claim 13, the recording of annotations of the respective users includes:
recording annotations by respective annotation applications of the respective users.

* * * * *